(12) United States Patent
Rauhala et al.

(10) Patent No.: US 9,417,740 B2
(45) Date of Patent: Aug. 16, 2016

(54) CAPACITIVE SENSING APPARATUS WITH A SHIELD ELECTRODE

(71) Applicant: Nokia Corporation, Espoo (FI)

(72) Inventors: Jyri Rauhala, Tampere (FI); Juha Harri-Pekka Nurmi, Salo (FI); Seppo Turunen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 156 days.

(21) Appl. No.: 13/733,238

(22) Filed: Jan. 3, 2013

(65) Prior Publication Data

US 2014/0184553 A1      Jul. 3, 2014

(51) Int. Cl.
*G06F 3/044*          (2006.01)

(52) U.S. Cl.
CPC ...... *G06F 3/044* (2013.01); *G06F 2203/04107* (2013.01)

(58) Field of Classification Search
CPC ........ G06F 3/044; G06F 3/045; G06F 3/0488
USPC .................................................. 345/156–178
See application file for complete search history.

(56) References Cited

U.S. PATENT DOCUMENTS

| | | | |
|---|---|---|---|
| 4,495,485 A | 1/1985 | Smith | 340/365 |
| 5,457,289 A | 10/1995 | Huang et al. | 178/20 |
| 2007/0018919 A1 | 1/2007 | Zavracky et al. | 345/87 |
| 2008/0062139 A1 | 3/2008 | Hotelling et al. | 345/173 |
| 2008/0277171 A1* | 11/2008 | Wright | 178/18.06 |
| 2010/0220071 A1* | 9/2010 | Nishihara et al. | 345/173 |
| 2011/0007021 A1* | 1/2011 | Bernstein et al. | 345/174 |
| 2011/0018560 A1 | 1/2011 | Kurashima | 324/679 |
| 2011/0058116 A1 | 3/2011 | Yamazaki et al. | 349/43 |
| 2011/0310459 A1 | 12/2011 | Gates et al. | 359/296 |
| 2012/0038583 A1 | 2/2012 | Westhues et al. | 345/174 |
| 2012/0044199 A1 | 2/2012 | Karpin et al. | 345/174 |
| 2012/0262418 A1 | 10/2012 | Lee | 345/174 |
| 2013/0033450 A1* | 2/2013 | Coulson | G06F 3/044 345/174 |

OTHER PUBLICATIONS

"Multek Display Solutions", http://www.globalepec.com/supplier/profile/MultekDisplayandTouchSolutions, (2 pages).

* cited by examiner

*Primary Examiner* — Kent Chang
*Assistant Examiner* — Nathan Brittingham
(74) *Attorney, Agent, or Firm* — Harrington & Smith

(57) ABSTRACT

An apparatus including a plurality of capacitive sensing cells distributed over a sensing area, wherein each capacitive sensing cell includes a capacitive sensor electrode and at least one switch; a plurality of output conductive traces, wherein each output conductive trace is configured to provide an output from multiple capacitive sensing cells; a plurality of control conductive traces, wherein each control conductive trace is configured to provide a control input to multiple capacitive sensing cells, wherein the switch of a capacitive sensing cell is configured to be controlled by one of the plurality of control conductive traces to enable a conductive path between the capacitive sensor electrode of the capacitive sensing cell and one of the plurality of output conductive traces; and a shield electrode overlying at least portions of the output conductive traces or the control conductive traces while exposing at least portions of the capacitive sensor electrodes.

18 Claims, 7 Drawing Sheets

CAPACITIVE SENSING APPARATUS WITH A SHIELD ELECTRODE

TECHNOLOGICAL FIELD

Embodiments of the present invention relate to an apparatus. In particular, they relate to an apparatus comprising a plurality of capacitive sensor electrodes distributed over a sensing area.

BACKGROUND

Current touch sensitive displays may use a plurality of capacitive sensor electrodes distributed over a sensing area. The capacitive sensor electrodes sense a proximal grounded object such as a user's finger touching the sensing area.

BRIEF SUMMARY

According to various, but not necessarily all, embodiments of the invention there is provided an apparatus comprising: a plurality of capacitive sensing cells distributed over a sensing area, wherein each capacitive sensing cell comprises a capacitive sensor electrode and at least one switch; a plurality of output conductive traces, wherein each output conductive trace is configured to provide an output from any of multiple capacitive sensing cells; a plurality of control conductive traces, wherein each control conductive trace is configured to provide a control input to multiple capacitive sensing cells, wherein the switch of each capacitive sensing cell is configured to be controlled by one of the plurality of control conductive traces to enable a conductive path between the capacitive sensor electrode of the capacitive sensing cell and one of the plurality of output conductive traces; and a shield electrode overlying at least portions of the output conductive traces or the control conductive traces while exposing at least portions of the capacitive sensor electrodes.

According to various, but not necessarily all, embodiments of the invention there is provided an apparatus comprising: an array of capacitive sensor electrodes comprising a plurality of distinct capacitive sensor electrodes distributed over a sensing area in N rows and M columns; an array of switches distributed over a sensing area in N rows and M columns, each switch being adjacent an associated one of the capacitive sensor electrodes; row conductive traces each extending parallel to an adjacent one of the rows of capacitive sensor electrodes; column conductive traces each extending parallel to an adjacent one of the columns of capacitive sensor electrodes, wherein each capacitive sensor electrode in each row of capacitive sensor electrodes is operatively connected to the adjacent row conductive trace via its associated switch and wherein each column conductive trace is operatively connected to control the switches associated with a column of capacitive sensor electrodes; and a shield electrode overlying, in the sensing area, at least portions of the row conductive traces or the column conductive traces.

BRIEF DESCRIPTION

For a better understanding of various examples of embodiments of the present invention reference will now be made by way of example only to the accompanying drawings in which.

Figure 4A:
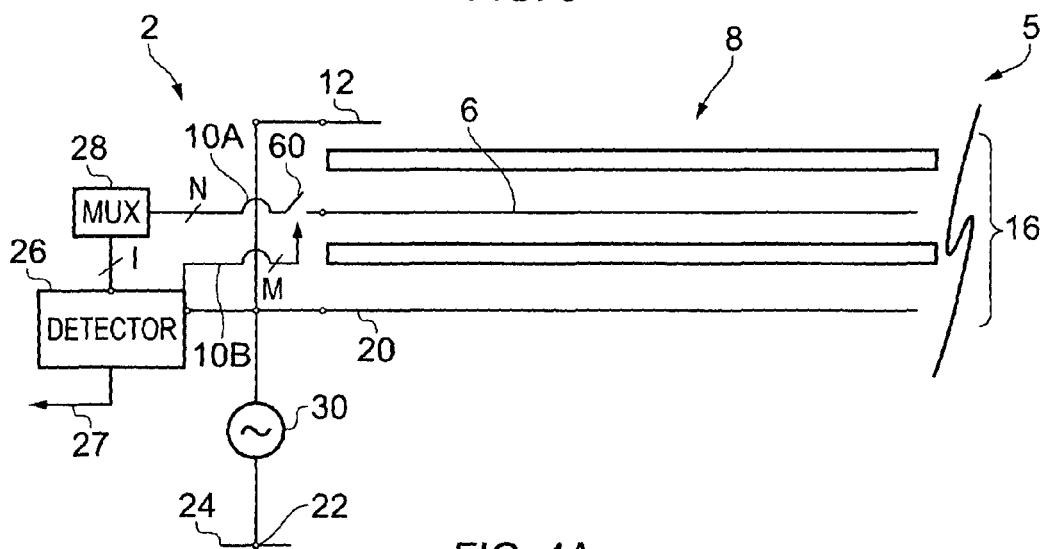
Figure 4B:
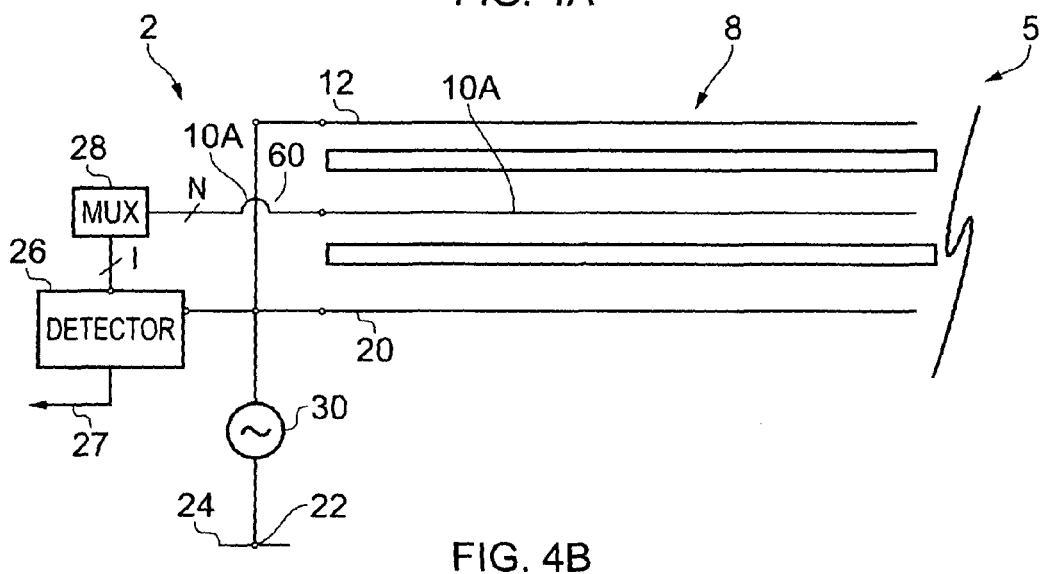
Figure 5:
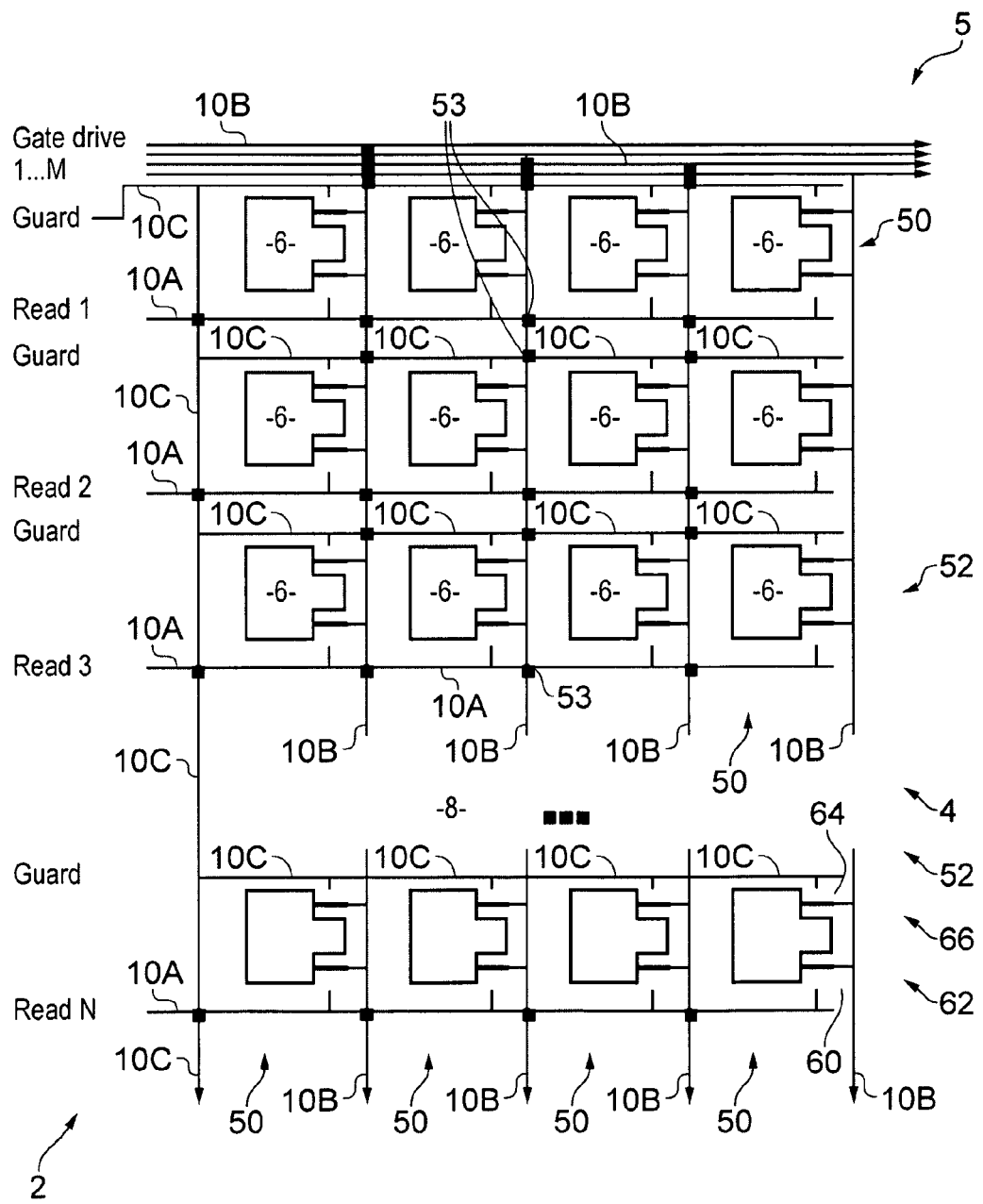
Figure 6:
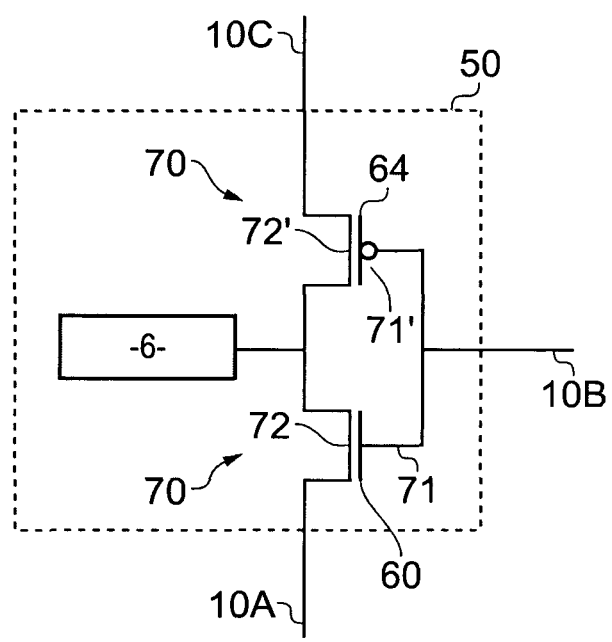
Figure 7:
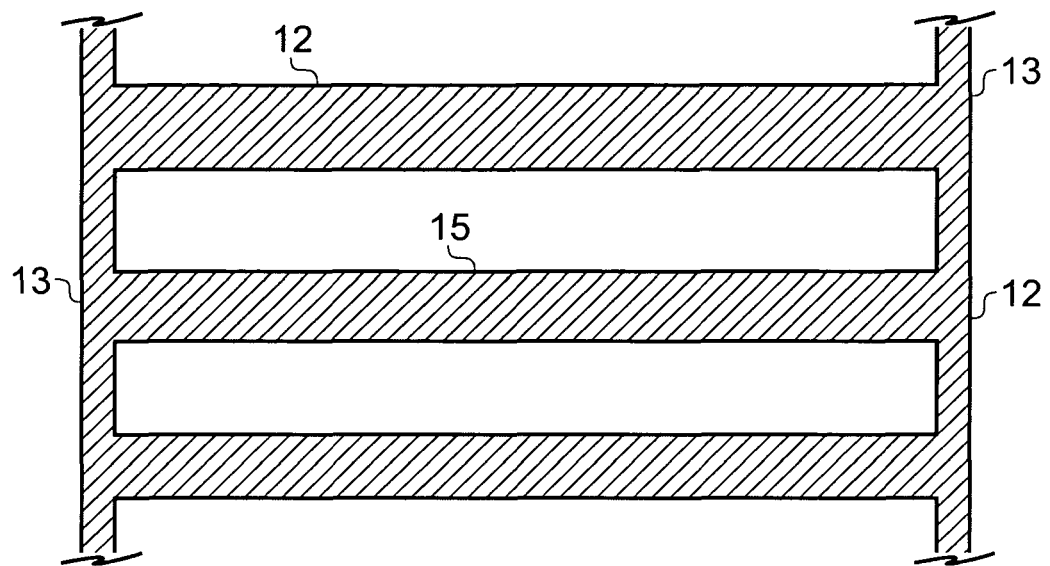
Figure 8:
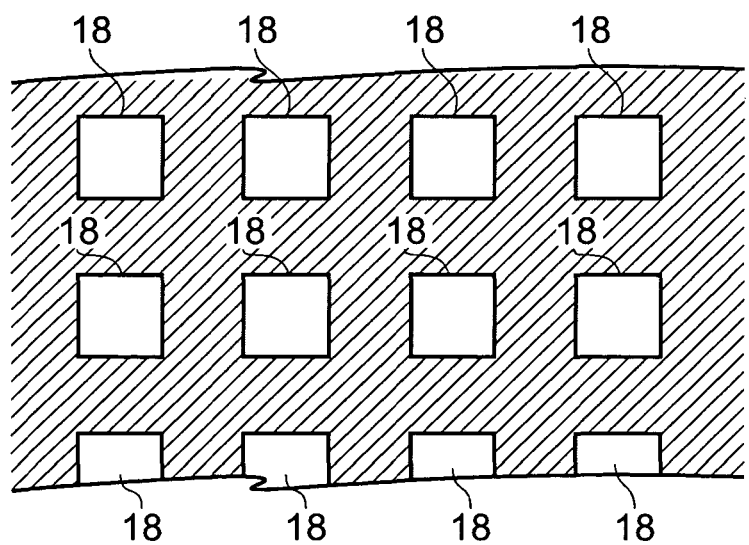
Figure 9A:
Figure 9B:
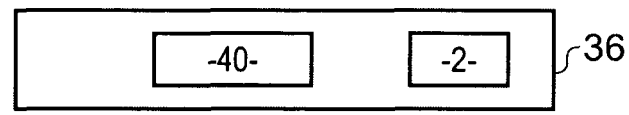

FIGS. 4A and 4B schematically illustrate different cross-sections through the same sensing arrangement;

FIG. 5 illustrates another example of an apparatus comprising a sensing arrangement comprising a plurality of capacitive sensing cells distributed in a regular array over a sensing area;

FIG. 6 illustrates one of a plurality of capacitive sensing cells of the sensing arrangement of FIG. 5, comprising a capacitive sensor electrode, a switch and a further switch;

FIG. 7 illustrates an example of a shield electrode;

FIG. 8 illustrates another example of a shield electrode;

FIG. 9A illustrates an example of a touch panel module;

FIG. 9B illustrates an example of a touch sensitive display module; and

Figure 9C:
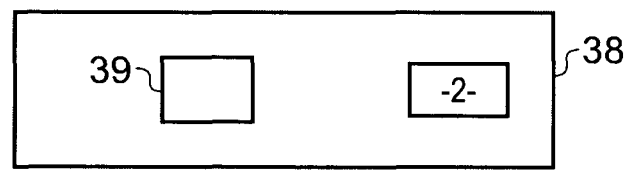

FIG. 9C illustrates an example of an electronic device.

DETAILED DESCRIPTION

The Figures illustrate an apparatus 2 comprising: a plurality of capacitive sensing cells 50 distributed over a sensing area 8, wherein each capacitive sensing cell 50 comprises a capacitive sensor electrode 6 and at least one switch 60; a plurality of output conductive traces 10A, wherein each output conductive trace 10A is configured to provide an output from any of multiple capacitive sensing cells 50; a plurality of control conductive traces 10B, wherein each control conductive trace 10B is configured to provide a control input to multiple capacitive sensing cells 50; wherein the switch 60 of a capacitive sensing cell 50 is configured to be controlled by one of the plurality of control conductive traces 10B to enable a conductive path between the capacitive sensor electrode 6 of the capacitive sensing cell 50 and one of the plurality of output conductive traces 10A; and a shield electrode 12 overlying at least portions of the output conductive traces 10A or the control conductive traces 10B while exposing at least portions of the capacitive sensor electrodes 6.

Figure 1:
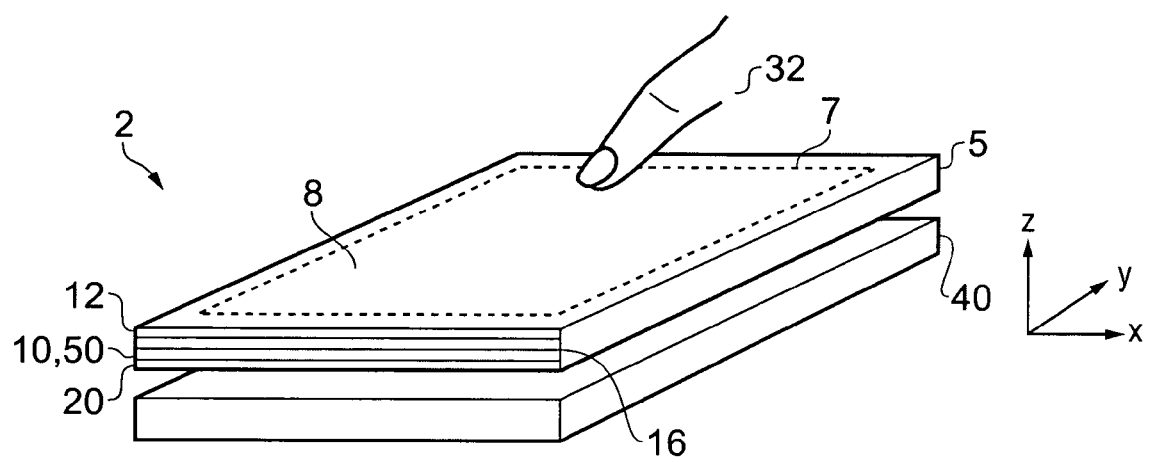
FIG. 1 illustrates an example of an apparatus comprising a sensing arrangement comprising a plurality of capacitive sensing cells distributed over a sensing area.

FIG. 1 illustrates an apparatus 2 comprising: a sensing arrangement 5 comprising a plurality of sensing cells 50 distributed over a sensing area 8; conductive traces 10 at least partially distributed over the sensing area 8; and a shield electrode 12 partially overlying the sensing arrangement 5.

In this example, the apparatus 2 overlies a display 40 and operates as a capacitive touch panel for the display 40. The display 40 and the apparatus 2 in combination form a touch sensitive display configured to detect a variation in capacitance arising from proximity of a user input device 32 to one or more of the plurality of sensing cells 50.

The sensing arrangement 5 is configured to sense a variation in capacitance arising from proximity of a user input device 32 at or over the sensing area 8 of a touch surface 7. In this example the user input device 32 is a user's finger.

The apparatus 2 is configured to sense not only the (x, y) position of the user's finger within the sensing area 8 when it touches the sensing area 8 of the touch surface 7 but may also, in this example, additionally provide a (z) position of the user's finger when it is close to but not touching the sensing area 8 of the touch surface 7 and/or provide an (x, y) position of the user's finger when it is close to but not yet touching the sensing area of the touch surface 7. The apparatus 2 therefore provides for not only two-dimensional sensing but also three-dimensional sensing.

Optionally, the apparatus 2 may also comprise a further shield electrode 20 underlying, in the sensing area 8, the conductive traces 10 and the capacitive sensing cells 50. The further shield electrode 20 may be a continuous uninterrupted electrode.

The shield electrode 12, the conductive traces 10, the capacitive sensing cells 50 and, if present, the further shield electrode 20 are all positioned at least within the sensing area 8 and overlie, in this example, a display 40. As they overlie a display 40 they are preferably transparent or, if not transparent, they may be of a size that is not normally resolved by the human eye at a working distance of, for example, 30 cm.

Figure 2:
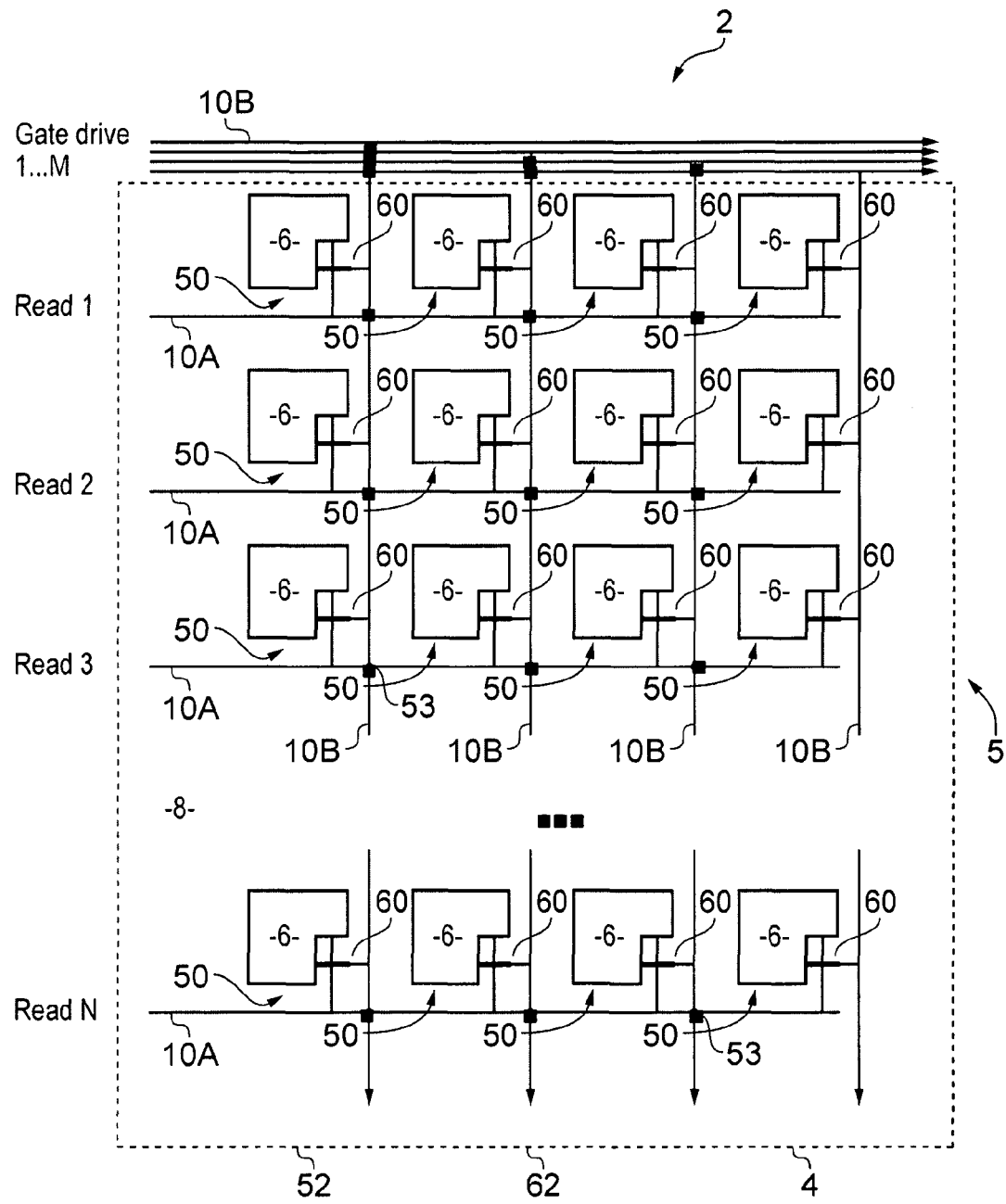
FIG. 2 illustrates an example of an apparatus comprising a sensing arrangement comprising a plurality of capacitive sensing cells distributed in a regular array over a sensing area.
Figure 3:
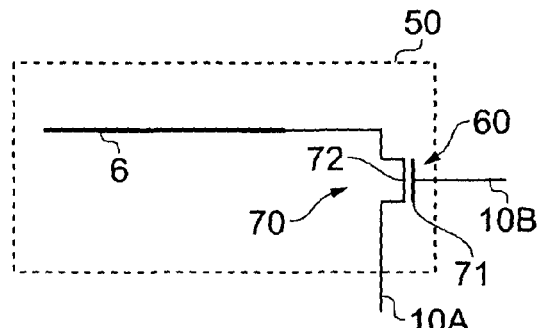
FIG. 3 illustrates one of a plurality of capacitive sensing cells of the sensing arrangement of FIG. 2, comprising a capacitive sensor electrode and a switch.

As illustrated in FIG. 2 and FIG. 3, each capacitive sensing cell 50 comprises a capacitive sensor electrode 6 and at least one switch 60.

The conductive traces 10 comprise a plurality of output conductive traces 10A and a plurality of control conductive traces 10B. Each output conductive trace 10A is configured to provide an output from multiple capacitive sensing cells 50. Each control conductive trace 10B is configured to provide a control input to multiple capacitive sensing cells 50.

The switch 60 of a capacitive sensing cell 50 is configured to be controlled by one of the plurality of control conductive traces 10B to enable a conductive path between the capacitive sensor electrode 6 of the capacitive sensing cell 50 and one of the plurality of output conductive traces 10A.

The shield electrode 12, the conductive traces 10, the capacitive sensor electrodes 6 and, if present, the further shield electrode 20 may be formed from conductive and transparent material. They may be formed from the same or similar material or mixtures of materials. Examples of suitable conductive and transparent materials include, for example, Indium-Tin-Oxide (ITO), metal mesh, silver nanowires and carbon nanotube composite.

The switches 60 may be formed using thin film technology, for example, as currently used in organic light emitting diode displays.

FIG. 2 illustrates an example of an apparatus 2 comprising a sensing arrangement comprising a plurality of sensing cells 50 distributed over a sensing area 8.

The plurality of capacitive sensing cells 50 are distributed over the sensing area 8 as an N row by M column regular array 52. The array 52 is regular because the rows are evenly spaced and also the columns are evenly spaced. The respective spacing between rows and the spacing between columns may be the same or different.

Each capacitive sensing cell 50 comprises a capacitive sensor electrode 6 and an adjacent associated switch 60. The capacitive sensor electrodes 6 may have equal operational size and equal operational capacitance. The switches 60 may be thin film field effect transistors.

In this example the capacitive sensor electrodes 6 have sizes less than 0.5 $cm^2$. They may for example have dimensions of less than 6 mm by 6 mm.

Each of the plurality of output conductive traces 10A extends parallel to an adjacent one of the N rows of sensing cells 50. It is configured to provide an output from the M capacitive sensing cells 50 in that adjacent row of sensing cells.

Each of the plurality of control conductive traces 10B extends parallel to an adjacent one of the M columns of sensing cells 50. A control conductive trace 10B is configured to provide a control input to the N sensing cells 50 in that adjacent column of sensing cells 50.

In the Figure, where conductive traces cross but do not connect (bridges 53) is consistently indicated using a solid square symbol in this Figure. Only some of the bridges are labelled with reference 53 for clarity.

Thus the plurality of output conductive traces 10A and the plurality of control conductive traces 10B are arranged orthogonally parallel to rows (the output conductive traces 10A) and columns (the control conductive traces 10B).

Each sensing cell is associated with a particular pair of output conductive trace 10A and control conductive trace 10B. That pair of output conductive trace 10A and control conductive trace 10B uniquely identifies the associated capacitive sensing cell 50.

The switch 60 of a capacitive sensing cell 50 is configured to be controlled by its associated control conductive trace 10B to enable a conductive path between the capacitive sensor electrode 6 of the capacitive sensing cell 50 and the associated output conductive trace 10A.

The plurality of capacitive sensing cells 50 are distributed over the sensing area 8 as an N row by M column regular array 52. The capacitive sensor electrodes 6 and the switches 60 may have fixed positions within the capacitive sensing cells. Thus the capacitive sensor electrodes 6 may also be arranged as an N row by M column regular array 4 and the switches 60 may also be arranged as an N row by M column regular array.

A shield electrode 12 (not illustrated in this Figure) overlies at least portions of the output conductive traces 10A and/or the control conductive traces 10B while exposing at least portions of the capacitive sensor electrodes 6.

FIG. 3 illustrates one of a plurality of capacitive sensing cells 50 of the sensing arrangement 5 of FIG. 2, comprising a capacitive sensor electrode 6 and a switch 60.

The switch 60 of the capacitive sensing cell 50 is provided by a transistor 70, for example, a thin film transistor. A gate 71 of the transistor 70 is connected to the control conductive trace 10B associated with the capacitive sensing cell 50. A signal on that control conductive trace 10B can be used to control the conductivity of the transistor channel 72 and enable a conductive path, through the channel 72, between the capacitive sensor electrode 6 of the capacitive sensing cell 50 and the output conductive trace 10A associated with the capacitive sensing cell 50.

FIGS. 4A and 4B schematically illustrate different partial cross-sections through the same example of a sensing arrangement 5. The cross-sections are orthogonal to a plane occupied by the plurality of capacitive sensing cells. It should be appreciated that only a single capacitive sensor electrode 6 is illustrated but additional NM-1 distinct capacitive sensor electrodes 6 will be present depth-wise (into the page) and width-wise (across the page).

FIG. 4A schematically illustrates a cross-section through the sensing arrangement 5 along a line corresponding to an 'operational' capacitive sensor electrode 6. That is the shield electrode 12 along this cross-section does not cover the capacitive sensor electrodes 6. The portion of the shield electrode 12 illustrated may be part of a guard portion that extends around the perimeter of the sensing area 8 or a portion between two adjacent openings to adjacent capacitive sensor electrodes 6.

FIG. 4B schematically illustrates a cross-section through the sensing arrangement 5 along a line corresponding to where the shield electrode 12 is present in the sensing area 8. That is the shield electrode 12 along this cross-section does cover all or some of the conductive traces 10 and, optionally, some of the capacitive sensor electrode 6. In this illustrated example, the shield electrode 12 along this cross-section covers the output conductive traces 10A.

In FIGS. 4A and 4B, the capacitive sensor electrodes 6, and some of the conductive traces 10 may be arranged within a common plane 16. They may, for example, be formed by patterning a planar layer of transparent conductive material.

In FIGS. 4A and 4B, the apparatus 2 may comprise circuitry as described below, however other circuitry is possible. Such circuitry may be configured to provide a voltage to the shield electrode 12. If the further shield electrode 20 is present, the same voltage may be provided to the shield electrode 12 and the further shield electrode 20. The provided voltage may be a fixed voltage or a time-varying voltage. One of many examples of a time-varying voltage is an alternating sinusoidal voltage.

In FIGS. 4A and 4B, the shield electrode 12 is operatively connected to a node 22. Operatively connected means that there is a signal path but they may or may not be directly physically connected. When the apparatus 2 is operational the node 22 is held at a constant potential such as, for example, ground potential. Circuitry 24 is configured to provide the constant potential. This could be a simple galvanic connection to ground provided by, for example, a housing, a ground plane or a chassis.

In this example, a further shield electrode 20 is present. It is also operatively connected to the node 22.

Detection circuitry 26 is operatively connected between the shield electrode 12 and the array 4 of capacitive sensor electrodes 6.

A multiplexer 28 is operatively connected between the detection circuitry 26 and the array 4 of capacitive sensor electrodes 6. The multiplexer 28 is configured to isolate, for detection, each of the plurality of output conductive traces 100A.

In this example, drive circuitry 30 is configured to provide a time-varying voltage to the shield electrode 12 and, if present, the further shield electrode 20. The time-varying voltage may be, for example, an alternating sinusoidal voltage.

The drive circuitry 30 is thus configured to provide a time-varying electric field at each of the capacitive sensor electrodes 6.

The detection circuitry 26 is configured to detect a variation in capacitance arising from proximity of a user input device 32 to one or more of the plurality of sensor electrodes 6. The detection circuitry 26 may comprise a low-impedance charge amplifier.

When the user's hand, or some other grounded user input device 32, is brought to the vicinity of the sensing area 8 of the apparatus 2, a capacitive current flows from the shield electrode 12 through the detection circuitry 26 to one or more capacitive sensor electrodes 6. The charge amplifier in the detection circuitry 26 registers a charge displacement due to the current over a period of several cycles of the current, if it is time-varying. The output of the charge amplifier may be rectified, for example synchronously rectified, and integrated, after which it is passed to an analog-to-digital converter and then provided as digital output 27 for processing in the digital domain.

The drive voltage and the drive frequency typically range from 1 Volt to 10 Volt and from 10 to 200 kHz, respectively.

Due to reasons of cost and size, a single charge amplifier and a single analog-to-digital converter may be used in the detection circuitry 26 for multiple capacitive sensor electrodes 6 and a multiplexer 28 may be used to isolate for sensing each of the plurality of output conductive traces 10A separately.

Detection circuitry 26 may also be operatively connected to each of the control conductive traces 10B and may selectively activate each control conductive trace 10B to control operation of the switches 60.

FIG. 5 illustrates another example of an apparatus 2 comprising a sensing arrangement 5 comprising a plurality of sensing cells 50 distributed over a sensing area 8.

The sensing arrangement 5, in this example, is similar to that illustrated in FIG. 4 and like references are used for like features. However, the capacitive sensing cells 50 of the apparatus 2 of FIG. 5 are different and the sensing arrangement 5 additionally comprises further conductive traces 10C.

Each capacitive sensing cell 50 not only comprises a switch 60 as previously described but additionally comprises a further switch 64 that is configured to enable a conductive path between the capacitive sensor electrode 6 of the capacitive sensing cell 50 and one of the plurality of further conductive traces 10C.

In the Figure, the plurality of capacitive sensing cells 50 are distributed over the sensing area 8 as an N row by M column regular array 52.

Each capacitive sensing cell 50 comprises a capacitive sensor electrode 6, an adjacent associated switch 60 and an adjacent associated further switch 64.

The capacitive sensor electrodes 6 may have equal operational size and equal operational capacitance. The switches 60, 64 may be thin film field effect transistors.

In this example the capacitive sensor electrodes 6 have sizes less than 0.5 cm². They may for example have dimensions of less than 6 mm by 6 mm.

Each of a plurality of output conductive traces 10A extends parallel to an adjacent one of the N rows of sensing cells 50. Each output conductive trace 10A is configured to provide an output from the M capacitive sensing cells 50 in that adjacent row of sensing cells.

Each of a plurality of control conductive traces 10B extends parallel to an adjacent one of the M columns of sensing cells 50. A control conductive trace 10B is configured to provide a control input to the N sensing cells 50 in that adjacent column of sensing cells 50.

Each of a plurality of further conductive traces 10C extends parallel to an adjacent one of the N rows of sensing cells 50. Each further conductive trace 10C is configured to provide an input to the M capacitive sensing cells 50 in that adjacent row of sensing cells.

In the Figure, where conductive traces 10A, 10B, 10C cross but do not connect (bridges 53) is consistently indicated using a solid square symbol in this Figure. Only some of the bridges are labelled with reference 53 for clarity.

Each sensing cell is associated with a particular pair of output conductive trace 10A and control conductive trace 10B. That pair of output conductive trace 10A and control conductive trace 10B uniquely identifies the associated capacitive sensing cell 50.

Each sensing cell is also associated with a particular further conductive trace 10C.

The switch 60 of a capacitive sensing cell 50 is configured to be controlled by the associated control conductive trace 10B to enable a conductive path between the capacitive sensor electrode 6 of the capacitive sensing cell 50 and the associated output conductive trace 10A.

The further switch 64 of a capacitive sensing cell 50 is configured to be controlled by the associated control conductive trace 10B to enable a conductive path between the capacitive sensor electrode 6 of the capacitive sensing cell 50 and the associated further conductive trace 10C.

The switch 60 and further switch 64 of a capacitive sensing cell 50 share in common a control conductive trace 10B and are complementary. An enable signal on the common control conductive trace 10B enables the switch 60 and disables the further switch 64 and a disable signal on the common control conductive trace 10B disables the switch 60 and enables the further switch 64.

The plurality of capacitive sensing cells 50 are distributed over the sensing area 8 as an N row by M column regular array 52. The capacitive sensor electrodes 6 and the switches 60, 64 may have fixed positions within the capacitive sensing cells 50. Thus the capacitive sensor electrodes 6 may also be arranged as a regular array 4 and the switches 60, 64 may also be arranged as a regular arrays 62, 66.

A shield electrode 12 (not illustrated in this Figure) overlies at least portions of the output conductive traces 10A and/or the control conductive traces 10B and/or the further conductive traces 10C while exposing at least portions of the capacitive sensor electrodes 6.

FIG. 6 illustrates one of a plurality of capacitive sensing cells 50 of the sensing arrangement 5 of FIG. 5, comprising a capacitive sensor electrode 6, a switch 60 and a further switch 64.

The switch 60 of the capacitive sensing cell 50 is provided by a transistor 70, for example, a thin film transistor. A gate 71 of the transistor 70 is connected to the control conductive trace 10B associated with the capacitive sensing cell 50. An enable/disable signal on that control conductive trace 10B can be used to control the conductivity of the transistor channel 72 and enable/disable a conductive path, through the channel 72, between the capacitive sensor electrode 6 of the capacitive sensing cell 50 and the output conductive trace 10A associated with the capacitive sensing cell 50.

The further switch 64 of the capacitive sensing cell 50 is provided by a transistor 70', for example, a thin film transistor. A gate 71' of the transistor 70' is connected to the same control conductive trace 10B associated with the capacitive sensing cell 50. The transistor 70' is complementary to the transistor 70, Thus the enable/disable signal on that control conductive trace 10B can be used to control the conductivity of the transistor channel 72' and disable/enable a conductive path, through the channel 72', between the capacitive sensor electrode 6 of the capacitive sensing cell 50 and the further conductive trace 100C associated with the capacitive sensing cell 50.

The operation of the sensing arrangement 5 of FIG. 5 may be understood by reference back to FIGS. 4A and 4B. The operation of a the sensing arrangement 5 of FIG. 5 is the same as the operation of the sensing arrangement 5 of FIG. 2 previously described with reference to FIGS. 4A and 4B, when a switch 60 of a capacitive sensing cell 50 is enabled. However, it is different when the switch 60 of a capacitive sensing cell 50 is disabled.

When the switch 60 of a capacitive sensing cell 50 is disabled then the further switch 64 of that capacitive sensing cell 50 is enabled operatively connecting the capacitive sensor electrode 6 of that capacitive sensing cell 50 to the further conductive trace 10C.

The drive circuitry 30 that provides a voltage to the shield electrode 12 may provide the same voltage to the further conductive traces 10C and, if a further shield electrode 20 is present, to the further shield electrode 20. The provided voltage may be a fixed voltage or a time-varying voltage. One of many examples of a time-varying voltage is an alternating sinusoidal voltage.

The drive circuitry 30 is thus configured to provide a time-varying electric field at each of the capacitive sensor electrodes 6.

The detection circuitry 26 may also be operatively connected to each of the control conductive traces 10B and may selectively activate each control conductive traces 10B.

If a second further shield electrode 20 is present it may underlie, in the sensing area, the conductive traces 10A, 10B, 10C, the switches 60, the further switches 64 (if present) and the sensor electrodes 6.

As illustrated in FIG. 7, the shield electrode 12 may extend across the whole of the sensing area 8 as a strip 15. In this example there are multiple parallel strips 15 and a guard portion 13 that extends around the perimeter of the sensing area 8. A strip may be associated with each row of cells 50. The shield electrode strips 15 may cover the output conductive traces 10A and parts of the control conductive traces 10B. The shield electrode strips 15 may cover portions of the further conductive traces 10C, if present. The guard portion 13 may cover parts of the control conductive traces 10B. The guard portion 13 may cover portions of the further conductive traces 10C, if present.

As illustrated in FIG. 8, the shield electrode 12 may cover the whole of the sensing area 8 except at openings 18 through the shield electrode 12 to the underlying capacitive sensor electrodes 6. The openings 18 are of equal size. The openings 18 can be of any shape (for example, rectangle (as shown in the attached drawing), round, star etc.). The shield electrode 12 may cover the output conductive traces 10A and the control conductive traces 10B. The shield electrode 12 may cover the further conductive traces 10C if present.

The portions of the capacitive sensor electrodes 6 that are uncovered define operational sensor electrodes 6 of equal operational size. As the capacitive sensor electrodes 6 are of similar construction they have the same capacitance per unit area. Therefore the operational sensor electrodes 6 of equal operational size have equal capacitance.

In this illustrated example, the shield electrode 12 may overlie, in the sensing area 8, all of the conductive traces 10.

In other examples, such as FIG. 7, the shield electrode 12 does not overlie, in the sensing area 8, all of the conductive traces 10 but instead may overlie more than 80% of the are occupied by the conductive traces 10.

It is desirable to keep the electrical resistance of the conductive traces 10 small to reduce resistance-capacitance (RC) delays and improve measurement speed. This may be achieved by using material that has a higher conductivity and/or by making the conductive traces 10 wider. However, widening the conductive traces 10 increases the area occupied by the conductive traces 10 and may create undesirable stray capacitance effects. However this effect is reduced or eliminated by the overlying shield electrode 12.

FIG. 9A illustrates an example of a touch panel module 34 that comprises the apparatus 2. The touch panel module 34 may be used in combination with a display to form a touch screen display.

FIG. 9B illustrates an example of a touch sensitive display module 36 that comprises the apparatus 2 and a display 40.

FIG. 9C illustrates an example of an electronic device 38 that comprises at least the apparatus 2. It may, for example, additionally comprise a processor 39 that processes the output 27 of the detection circuitry 26.

As used here 'module' refers to a unit or apparatus that excludes certain parts/components that would be added by an end manufacturer or a user.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a plurality of capacitive sensing cells distributed over a sensing area, wherein each capacitive sensing cell comprises a capacitive sensor electrode and at least one switch;
   a plurality of output conductive traces, wherein each output conductive trace is configured to provide an output from any of multiple capacitive sensing cells;
   a plurality of control conductive traces, wherein each control conductive trace is configured to provide a control input to multiple capacitive sensing cells, wherein the switch of each capacitive sensing cell is configured to be controlled by one of the plurality of control conductive traces to enable a conductive path between the capacitive sensor electrode of the capacitive sensing cell and one of the plurality of output conductive traces; and
   a shield electrode overlying at least portions of the output conductive traces or the control conductive traces while exposing at least portions of the plurality of capacitive sensor electrodes wherein the shield electrode extends across the sensing area so as to cover at least portions of the output conductive traces or the control conductive traces, but is discontinuous having areas where the at least portions of the plurality of capacitive sensor electrodes are exposed.

2. An apparatus as claimed in claim 1, wherein the shield electrode overlies at least portions of the output conductive traces and the control conductive traces.

3. An apparatus as claimed in claim 1, wherein the shield electrode overlies at least portions of the sensing area.

4. An apparatus as claimed in claim 1, wherein the shield electrode partially overlies at least some of the capacitive sensor electrodes.

5. An apparatus as claimed in claim 1, wherein the switches are thin film transistors.

6. An apparatus as claimed in claim 1, comprising a plurality of further conductive traces, wherein each capacitive sensing cell comprises a further switch, wherein the further switch of a capacitive sensing cell is configured to be controlled by one of the plurality of control conductive traces to enable a conductive path between the capacitive sensor electrode of the capacitive sensing cell and one of the plurality of further conductive traces.

7. An apparatus as claimed in claim 6, wherein the switch and further switch of a cell share a control conductive trace and are complementary, wherein a first signal on the common control conductive trace enables the switch and disables the further switch and wherein a second signal on the common conductive trace disables the switch and enables the further switch.

8. An apparatus as claimed in claim 6, comprising circuitry configured to provide a time-varying reference voltage signal to the further conductive traces.

9. An apparatus as claimed in claim 1, further comprising a further shield electrode underlying, in the sensing area, the conductive traces, the switches and the sensor electrodes.

10. An apparatus as claimed in claim 9, wherein the further shield electrode is a continuous uninterrupted electrode.

11. An apparatus as claimed in claim 9, comprising circuitry configured to provide a time-varying reference voltage signal to the further shield electrode and to the shield electrode.

12. An apparatus as claimed in claim 1, comprising detection circuitry connected between the shield electrode and the array of capacitive sensor electrodes comprising a multiplexer connected between the detection circuitry and the array of capacitive sensor electrodes, wherein the multiplexer is configured to isolate, for detection, each one of the plurality of output conductive traces.

13. An apparatus as claimed in claim 1, comprising drive circuitry configured to provide a time-varying electric field at each of the capacitive sensor electrodes and detection circuitry configured to detect a variation in capacitance arising from proximity of a user input device to one or more of the plurality of sensor electrodes, wherein the drive circuitry is configured to provide an alternating voltage to the shield electrode, and wherein the detection circuitry is configured to detect a variation in capacitance arising from proximity of a user input device at or over a touch surface.

14. An apparatus as claimed in claim 1, wherein the capacitive sensing cells are distributed over a sensing area in an array of N rows and M columns and wherein the plurality of output conductive traces and the plurality of control conductive traces are arranged orthogonally, parallel to rows and columns, wherein switches of the capacitive sensing cells are arranged as an array of N rows and M columns over the sensing area, each switch being adjacent an associated one of the capacitive sensor electrodes.

15. An apparatus as claimed in claim 1, wherein the capacitive sensor electrodes, the switches and the conductive traces are arranged within a common plane.

16. An apparatus as claimed in claim 1, wherein the capacitive sensor electrodes and the conductive traces are transparent.

17. An apparatus comprising:
   an array of capacitive sensor electrodes comprising a plurality of distinct capacitive sensor electrodes distributed over a sensing area in N rows and M columns;
   an array of switches distributed over a sensing area in N rows and M columns, each switch being adjacent an associated one of the capacitive sensor electrodes;
   row conductive traces each extending parallel to an adjacent one of the rows of capacitive sensor electrodes;
   column conductive traces each extending parallel to an adjacent one of the columns of capacitive sensor electrodes,
   wherein each capacitive sensor electrode in each row of capacitive sensor electrodes is operatively connected to the adjacent row conductive trace via its associated switch and
   wherein each column conductive trace is operatively connected to control the switches associated with a column of capacitive sensor electrodes; and
   a shield electrode overlying at least portions of the output conductive traces or the control conductive traces while exposing at least portions of the capacitive sensor electrodes wherein the shield electrode extends across the sensing area so as to cover at least portions of the output conductive traces or the control conductive traces, but is discontinuous having areas where the at least portions of the plurality of capacitive sensor electrodes are exposed.

18. An apparatus as claimed in claim 1 embodied as a device selected from the group comprising:
  touch panel module;
  touch sensitive display module; and
  electronic device.

\* \* \* \* \*